United States Patent
Fluhr

[15] 3,673,927
[45] July 4, 1972

[54] SEAL

[72] Inventor: Nils Allan Fluhr, Gavle, Sweden

[73] Assignee: Knut Arne Erik Rehnstrom, Sodra Fiskargatan, Gavle, Sweden

[22] Filed: Oct. 22, 1970

[21] Appl. No.: 83,084

[30] Foreign Application Priority Data

Oct. 27, 1969 Sweden..............................14641/69

[52] U.S. Cl. ................................................................92/98
[51] Int. Cl. ........................................................F01b 19/00
[58] Field of Search ...............................92/98, 99, 97, 100

[56] References Cited

UNITED STATES PATENTS

3,435,733  4/1969  Enke......................................92/98 R
3,188,970  6/1965  Harry et al. ...........................92/98 R

FOREIGN PATENTS OR APPLICATIONS

456,103  11/1926  Germany...................................92/97

Primary Examiner—Martin P. Schwadron
Assistant Examiner—Leslie J. Payne
Attorney—Diller, Brown, Ramik & Holt

[57] ABSTRACT

This disclosure relates to a seal between two relatively movable parts being spaced by at least one space with a feature of the seal being the provision between the parts of a casing or cover shutting off the space and attach to not only the one part but also to the other part. In the preferred usage of the seal, the casing or cover is disposed between a piston and a cylinder and has an annular form.

7 Claims, 5 Drawing Figures

3,673,927

NILS ALLAN FLUHR
INVENTOR
BY ATTORNEYS

SEAL

It is well-known to provide seals of different kinds between relatively movable parts, e.g. machine or motor elements. Recently a seal called roll gasket or roll seal was developed for sealing between as for example pistons and cylinders. The roll gasket or seal comprises basically a membrane which at one peripheral edge thereof is sealingly attached to the one machine or motor part and which at a second peripheral edge thereof is sealingly attached to the other machine or motor part, the membrane hermetically sealing off the space between said parts.

Such roll gasket or roll seals are however subject to drawbacks. Thus the seal membrane or roll gasket may readily rupture or otherwise be damaged if for some cause or another a negative pressure arises on one concave side of the membrane relatively to a second space on the convex side of the membrane. As a consequence, roll seals are not adapted for use for instance for sealing of pumps and the like where it is obvious that the pressure on either side of the seal will vary.

The present invention is related to a seal between two relatively movable parts being spaced by at least one space and which seal is superior to other seals known in the art. A feature of the seal according to the invention is the provision between said parts of a casing or cover shutting off the space and attached not only to the one part but also to the other part.

According to a preferred embodiment of the invention the casing or cover ia disposed between a piston and a cylinder and exhibits then an annular form.

With reference to the appended drawings there follows hereinafter a more particular description of one embodiment of the invention, selected as an example.

Figure 1:
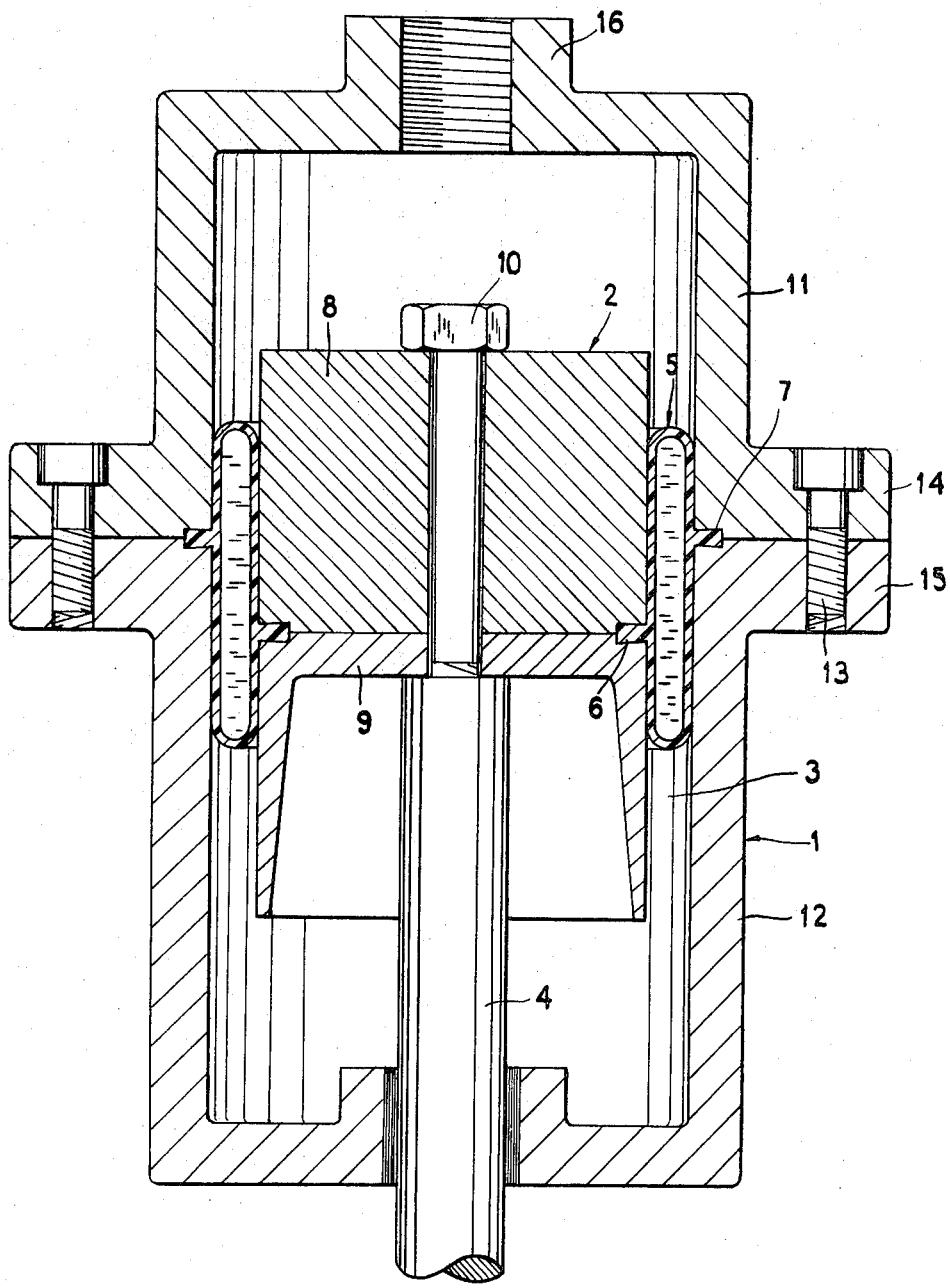
FIG. 1 illustrates a sectional view through a piston disposed in a cylinder and including a seal according to the invention.

In FIG. 1 1 designates a cylinder or cylinder-shaped enclosure in which is provided a piston 2 reciprocatable relatively to the cylinder, the outer diameter of the piston 2 being less than the inner diameter of the cylinder 1, whereby a play or circular space 3 is obtained between the piston and the cylinder exhibiting substantially an annular form. The piston 2 may in a manner well-known per se be movable by means of a piston rod 4 of a known or arbitrary kind.

According to the idea of the invention a casing 5 containing fluid and shutting off the slot is provided in the slot 3 which casing is attached to the piston 2 as well as to the cylinder 1. Owing to the annular shape of the slot 3 the casing 5 is annular. The walls of the casing are made of an elastic material preferably of fabric impregnated or faced with rubber or synthetic resin. The fluid in the casing may be of an arbitrary kind, though oil is preferred.

To secure the casing 5 to the piston and the cylinder, respectively, there is provided on the inner side of the casing a first mount 6 consisting of an annular flange or protrusion and besides there is provided on the outer side of the basing a second mount 7 likewise in the form of a flange or a protrusion. The inner protrusion 6 extends uniformally along the whole of the inner side of the casing and can be secured in different manners to the piston or the movable part 2. In FIG. 1 an embodiment is shown in which the piston 2 comprises two halves 8 and 9 which are interconnected by a screw 10. In the two disc halves 8 and 9 more or less marked, peripheral grooves are recessed in the border surface between the halves, which grooves are adapted for accommodating the inner protrusion 6 of the casing 5. On assembling the piston halves 8 and 9 the protrusion 6 will be tightly gripped by the peripheral grooves and held securely in a safe manner to the piston 2.

The fastening of the outer protrusion 7 to the cylinder 1 is realized in analogous manner. Thus the cylinder 1 is subdivided into two halves 11 and 12, an annular groove for accommodating the protrusion 7 being recessed in the border surface between the halves. On assembling the halves 11 and 12 as for example by means of screws 13 in particular flanges 14 and 15 the protrusion 7 will be securely gripped in said groove. It is thus obvious that liquids or other media will not be able to penetrate from one end of the slot 3 to its opposite end.

The device shown in FIG. 1 may, by way of example, be connected to an arbitrary pump device through a threaded stub 16 or similar.

Figure 2:
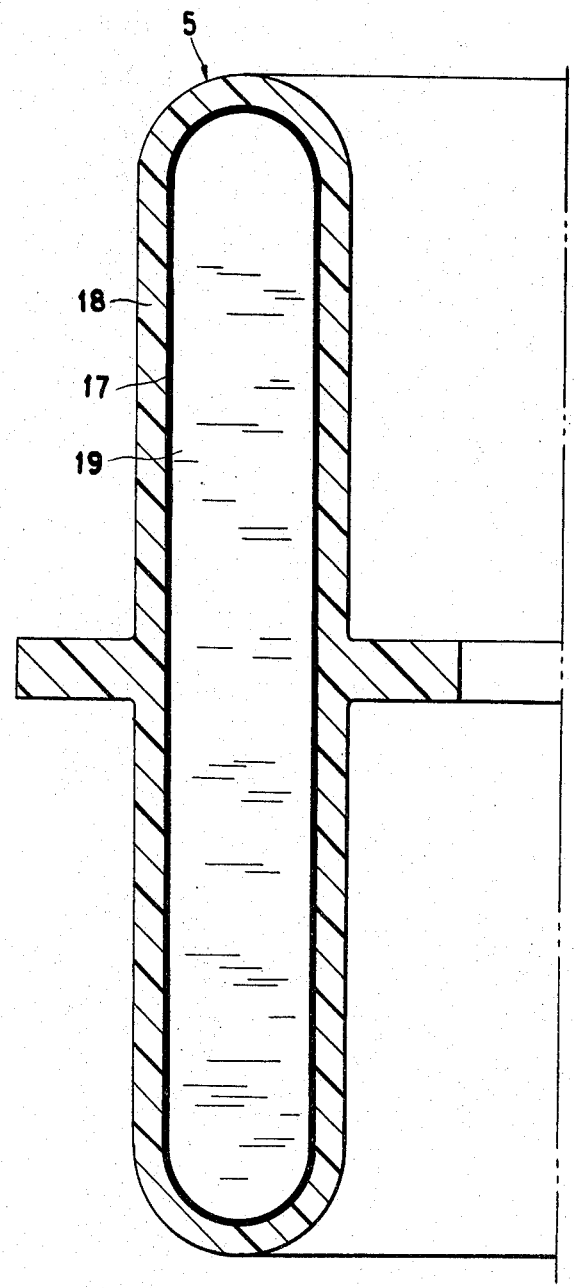
FIG. 2 shows an enlarged sectional view through the seal according to the invention.

In FIG. 2 an enlarged sectional view is shown of the casing seal 5 illustrated in FIG. 1. As appears by FIG. 2 the inventional casing or capsule seal may preferably be built up of an elastic or flexible inner layer 17 of fabric or similar, said layer being at least at its outer side impregnated or faced with a layer 18 of rubber or synthetic resin of a suitable kind. Hence, the fluid 19 is hermetically enclosed in the casing 5.

The size of the casing 5 and the distance between the mounts 6 and 7 will be determined by the stroke or length of movement of the mutually movable parts 1 and 2. Thus the distance mount-to-mount (6–7) should at least slightly exceed the stroke length of the piston 2. According to the invention the upper portion of the casing is limited by the mounts 6 and 7 will in this connection be of the same size as the lower portion of the casing limited by the same mounts.

The advantages of the invention are obvious in that any occurring pressure differences will be absorbed and ironed out by the fluid enclosed in the casing. Thereby the seal may preferably be used e.g. in connection with pumps and the like. The spacing elements in the seal casing involve i.a. the advantage that other guides between the piston and the cylinder may be dispensed with.

In the seal casing according to the invention there may preferably be enclosed one or more spacing elements 20 for holding the mutually movable parts 1 and 2 spaced from each other and to prevent simultaneously jamming or compression of the seal casing 5. In the embodiment shown in FIGS. 3–4 these spacing elements consist of balls or small spherical parts, but it is understood that also rolls may be used, being of a relatively short length with respect to their diameter and disposed with their rotation axes substantially parallel to tangents to the piston 2 or cylinder 1. The rolling elements or balls 20 should preferably be of a diameter approximately corresponding to the maximum space in the capsule sealing with respect to the radial direction of the piston and the cylinder.

Figure 3:
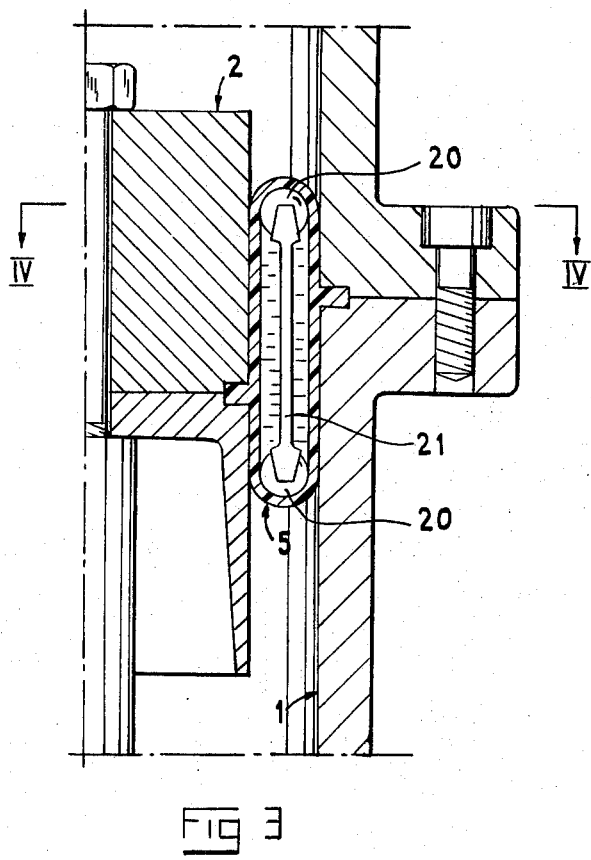
FIG. 3 shows how in a seal according to the invention there are disposed roll elements in the form of balls besides a retainer member for retaining the balls spaced from each other.

The balls 20 are in FIG. 3 shown to be disposed at a substantial distance from each other in the directions of movement of the mutually movable parts 1 and 2, and also peripherally spaced from each other. This spaced condition is assured by one or a plurality of separate retaining members 21. The retainer member 21 is preferably dimensioned in correspondence with the dimensions of the capsule casing 5 so as to keep the spacing elements 20 maximally spaced with respect to each other in the direction of movement of the parts 1, 2, whereby a particularly good guiding of the parts is obtained while simultaneously the casing or capsule will be kept expanded and prevented from collapse or contraction, folding and jammings caused thereby.

The retainer member 21 is herein shown to be of a structure presenting great resemblance to the retainer member of a ball or roller bearing and has grips for the balls 20. These grips should preferably be made in a manner to prevent the balls from falling out on handling outside the casing.

Figure 4:
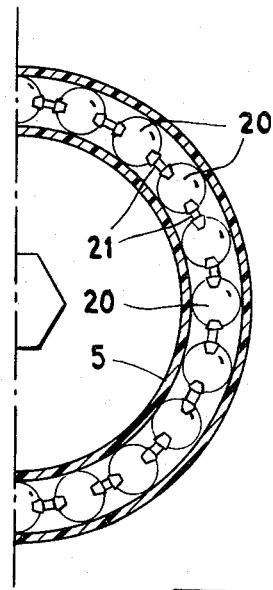
FIG. 4 shows a sectional view along the line IV—IV in FIG. 3.
Figure 5:
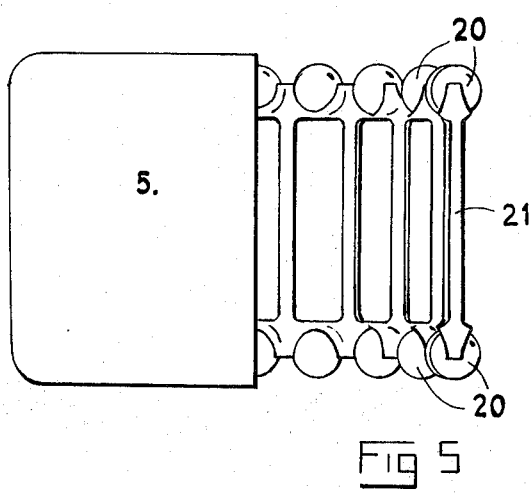
FIG. 5 illustrates further the structure of the retainer and the mounting of the balls in grips in the retainer.

As clearly evident in FIGS. 4 and 5 the spacing or rolling elements 20 are mounted in and retained by the retainer members 21 in two rim or ring formations spaced from each other, the rims or rings being provided in the portions of the casing 2 lengthmost from each other, maintaining safely the case or capsule seal in the proper expanded condition. It is of course possible to dispose and dimension the device so as to give the spacing elements 20 a greater or smaller stretching action on the casing material, which may be at least to some extent spring-elastic.

It is understood that the invention is not limited to the embodiment described above and illustrated in the drawings. Thus the case seal according to the invention may also be applied in connection with other kinds of machines or motor parts than just cylindershaped parts. Further the attachment of the case seal may be made in a variety of manners without departing from the idea of the invention. The ball retainer shown may consist of any material, e.g. metal or plastic material. It is accordingly possible to modify the invention in different manners within the scope of the appended patent claims.

I claim

1. A seal between two parts movable relatively to each other and spaced from one another, characterized by providing between said parts a hollow member containing a fluid and sealing the space between the two parts, said member being secured to both of said parts, and at least one spacing element freely enclosed in said member and being elongated in said direction of relative movement to maintain the relatively movable parts spaced from each other and simultaneously to prevent collapse of said member.

2. A seal according to claim 1, characterized in that the wall of said member is formed of a fabric at least exteriorly provided with a rubber-like material of the type including rubber and synthetic resin.

3. A seal according to claim 1, characterized in that there are a plurality of said spacing elements and said spacing elements are spaced from each other in the directions of movement of the movable parts.

4. A seal according to claim 3, characterized in that the spacing elements are maintained in a spaced condition from each other by separate retainer members.

5. A seal according to claim 4, characterized in that the retainer members are dimensioned in correspondence to the dimensions of said member so as to maintain the spacing elements at a maximum distance relative to each other in the movement direction of the parts, whereby a particularly good guiding of the parts is obtained while at the same time said member will be kept expanded and prevented from collapse.

6. A seal according to claim 4, characterized in that the spacing elements are in the form of rolling elements of the type including balls and rollers, and in that the retainer member has the character of the retainer ring of a rolling type bearing and is provided with grips for the spacing elements.

7. A seal according to any of claim 6, characterized in that the spacing elements are retained by the retainer member in at least two spaced ring rows, the ring rows being disposed in the portions of said member remote from each other.

* * * * *